United States Patent
Kleinrouweler et al.

(10) Patent No.: US 12,349,168 B2
(45) Date of Patent: Jul. 1, 2025

(54) ORCHESTRATING MIGRATION OF EDGE COMPUTING RESOURCES

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Jan-Willem Martin Kleinrouweler, Pijnacker (NL); Lucia D'Acunto, Rotterdam (NL); Toni DImitrovski, Rotterdam (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 385 days.

(21) Appl. No.: 17/782,101

(22) PCT Filed: Dec. 8, 2020

(86) PCT No.: PCT/EP2020/085046
§ 371 (c)(1),
(2) Date: Jun. 2, 2022

(87) PCT Pub. No.: WO2021/116090
PCT Pub. Date: Jun. 17, 2021

(65) Prior Publication Data
US 2023/0262740 A1    Aug. 17, 2023

(30) Foreign Application Priority Data

Dec. 9, 2019   (EP) .................................... 19214347

(51) Int. Cl.
*H04W 72/51*    (2023.01)
*H04W 36/32*    (2009.01)
*H04W 72/04*    (2023.01)

(52) U.S. Cl.
CPC ......... *H04W 72/51* (2023.01); *H04W 36/322* (2023.05); *H04W 72/04* (2013.01)

(58) Field of Classification Search
None
See application file for complete search history.

(56) References Cited

U.S. PATENT DOCUMENTS 8,812,050 B1 *   8/2014   Bencheikh .......... H04W 36/324
                                            455/435.2
2015/0319668 A1 *   11/2015   Guo ...................... H04W 72/51
                                            370/331

(Continued)

FOREIGN PATENT DOCUMENTS

CN         109844728 A      6/2019

OTHER PUBLICATIONS

Plachy, et al., "Dynamic Resource Allocation Exploiting Mobility Predication in Mobile Edge Computing," 2016 IEEE 27th Annual International Symposium on Personal, Indoor, and Mobile Radio Communications (PIMRC), pp. 1-6 (Sep. 2016).

(Continued)

*Primary Examiner* — Lonnie V Sweet
(74) *Attorney, Agent, or Firm* — Hamilton, Brook, Smith & Reynolds, P.C.

(57) ABSTRACT

The invention relates to a system configured as an orchestration function for a mobile network, wherein the mobile network comprises edge nodes which are configurable to provide edge computing resources to mobile devices, wherein the system is configured to at least in part orchestrate a migration of an edge computing resource for a mobile device from a first edge node to a second edge node. The orchestration function and the mobile device interact to enable the orchestration function to start the migration of the edge computing resource in a timely manner.

16 Claims, 6 Drawing Sheets

(56) References Cited

U.S. PATENT DOCUMENTS

| | | |
|---|---|---|
| 2017/0374580 A1 | 12/2017 | Mathew |
| 2018/0109590 A1* | 4/2018 | Rao et al. |
| 2019/0182730 A1* | 6/2019 | Yeh ..................... H04W 36/24 |
| 2020/0236602 A1* | 7/2020 | Mahkonen ............ H04W 76/25 |
| 2023/0140473 A1* | 5/2023 | Paredes Cabrera ... H04W 68/04 |
| | | 455/456.1 |

OTHER PUBLICATIONS

Farris, et al., "Providing Ultra-Short Latency to User-Centric 5G Applications at the Mobile Network Edge," Transactions on Emerging Telecommunications Technologies, 29(4), e 3169 (2018), 14 Pages.

Sun, et al., "EdgeIoT: Mobile Edge Computing for the Internet of Things," IEEE Communications Magazine, 54(12), 22-29 (2016), 7 Pages.

The Extended European Search Report issued on Mar. 30, 2020 for EP Application No. 19214347.7, entitled "Orchestrating Migration of Edge Computing Resources,", 7 Pages.

The Written Opinion and International Search Report mailed on Jan. 26, 2021 for International Application No. PCT/EP2020/085046, entitled "Orchestrating Migration of Edge Computing Resources.", 10 Pages.

* cited by examiner

ORCHESTRATING MIGRATION OF EDGE COMPUTING RESOURCES

RELATED APPLICATIONS

This application is the U.S. National Stage of International Application No. PCT/EP2020/085046, filed Dec. 8, 2020, which designates the U.S., published in English, and claims priority under 35 U.S.C. § 119 or 365(c) to European Application No. 19214347.7, filed Dec. 9, 2019. The entire teachings of the above applications are incorporated herein by reference.

FIELD OF THE INVENTION

The invention relates to a system configured as an orchestration function for a mobile network, wherein the mobile network comprises edge nodes which are configurable to provide edge computing resources to mobile devices, wherein the system is configured to at least in part orchestrate a migration of an edge computing resource for a mobile device from a first edge node to a second edge node. The invention further relates to a computer-implemented method for at least in part orchestrating a migration of an edge computing resource for a mobile device from a first edge node to a second edge node. The invention further relates to the mobile device and to a computer-implemented method for use with the mobile device.

The invention further relates to a computer readable medium comprising transitory or non-transitory data representing a computer program comprising instructions for causing a processor system to perform one of the methods.

BACKGROUND ART

Edge computing (or multi-access edge computing (MEC) as introduced by the ETSI Industry Specification Group) typically involves edge nodes at the 'edge' of a telecommunication network providing computing resources to clients of the network. For that purpose, the edge nodes may be arranged in an 'edge cloud' by in which cloud computing paradigms are used to provide the computing resources to clients, but edge nodes may also on an individual basis provide such computing resources to clients.

Because the edge is located relatively close to a client, edge computing resources (e.g., computing, content, a combination of both) may be available at high bandwidth, low latency, and with high-availability. Because of these features, edge computing is seen as the enabler of demanding applications on mobile networks.

Typical use cases for edge computing involve offloading computing functionality to the edge. For example, a mobile client may upload raw data to the edge, where it may be processed and forwarded to a central cloud. The advantages of such edge computing may be that mobile clients, which may be battery powered, do not need heavy computing capabilities, and the processing by edge may avoid having to send raw data to the central cloud, thus reducing the load on the backhaul network.

An example use case for edge computing is connected vehicles (CVs). CVs may be equipped with a large number of sensors which may acquire sensor data. The CVs may upload the sensor data, which may be characterized as high bandwidth and continuous high velocity flows, to the edge cloud. In the edge cloud, the data may be analyzed and communicated with other vehicles in the vicinity. Interpreted information may be forwarded in the form of metadata to a central cloud for storage. Depending on the environment (e.g., location, weather) or specific needs of the CV, the CV may send different sensor data and require a different analysis of this data by the edge.

To provide the necessary network performance for edge computing, the client and the edge node(s) may need to be nearby to each other in the network, which may be characterized in terms of latency, number of hops, etc. and/or in a more indirect manner in terms of bandwidth. This network proximity is also often, but not necessarily, reflected by a geographical proximity between the client and the edge node(s).

For example, in a mobile network having mobile devices as clients (also referred to as User Equipment, UE), high-bandwidth and (ultra) low-latency access to computing resources is typically only available when computing resources are located near the radio access point. Provisioning edge computing resources for stationary UEs may be considered straightforward. However, for mobile clients, the computing resources may have to travel with the UE to edge nodes that are nearby to the UE. For example, as also shown in FIG. 1, a mobile UE may move between base stations that are on its route, in that its radio communication may be handed over from one base station to another base station. A first group of base stations may be served by edge node 1, in that the base stations may each have a high-bandwidth network connection to edge node 1. However, as the UE travels further along the route, the UE's radio communication may be handed over to base stations that are served by another edge node. As such, edge computing resources may have to be migrated to the new edge node so as to still provide the necessary network performance for edge computing.

The migration of edge computing resources may for example involve obtaining a Virtual Machine (VM) image, instantiating a VM, transferring VM state from the source edge to the destination edge, and updating network routing to the VM.

In high mobility cases, e.g., at which UE move at high speed and/or edge nodes serve only a small area, the computing resources for a UE may have to be frequently migrated between edge nodes. When the destination edge node is not prepared for the migration (e.g., it does not have the VM image and/or application state), the migration may have to be temporarily delayed. During this time, network traffic may continue to be routed to the previous edge node, burdening the backhaul network with high-bandwidth traffic and/or providing reduced performance to the UE, in that UEs may experience an increase in latency and reduction in bandwidth.

It is known to proactively provision edge computing resources at new edge nodes to attempt to minimize unnecessary backhaul load and reduced performance.

In [1], [2] and [3], proactive provisioning is accomplished by pre-loading VMs on edges that are close to the current edge. To avoid starting too many VMs, mobility prediction may be used. Mobility prediction may be based on the serving base stations, serving edge nodes, or on GPS information which may be based on actual or historic mobility traces. [4] follows similar principles, but uses mobility prediction to place portions of content on different edge node alongside an expected path.

Disadvantageously, the mobility prediction of [1]-[4] may be based on assumptions on the mobility of the UE, which may be inaccurate. As such, the proactive provisioning may be suboptimal in that it may provision edge computing resources at edge nodes too early or too late in view of the actual mobility of the UE.

REFERENCES

[1] Sun, X., & Ansari, N. (2016). EdgeIoT: Mobile edge computing for the Internet of Things. *IEEE Communications Magazine,* 54(12), 22-29.
[2] Farris, I., Taleb, T., Flinck, H., & Iera, A. (2018). Providing ultra-short latency to user-centric 5G applications at the mobile network edge. *Transactions on Emerging Telecommunications Technologies,* 29(4), e3169.
[3] Plachy, J., Becvar, Z., & Strinati, E. C. (2016, September). Dynamic resource allocation exploiting mobility prediction in mobile edge computing. *In 2016 IEEE 27th Annual International Symposium on Personal, Indoor, and Mobile Radio Communications (PIMRC)* (pp. 1-6). IEEE.
[4] Mathew, N. (2017). U.S. patent application Ser. No. 15/191,190.

SUMMARY OF THE INVENTION

There may be a need for orchestrating the migration of edge computing resources which better takes into account the mobility of a mobile device.

The following measures provide a system which provides an orchestration function in the mobile network and a complementarily configured mobile device. Both entities may cooperate to enable the orchestration function to at least in part orchestrate the migration of edge computing resources for the mobile device. For that purpose, use may be made of the fact that the mobile device may follow a route which may be predicted, e.g., using the aforementioned network-based mobility prediction or by obtaining a planned route of the mobile device. The route may be obtained by the orchestration function, e.g., in a computer-readable form. In turn, the orchestration function may, e.g., based on its knowledge of the network topology, identify so-called migration points which may represent geographical locations at which a migration of edge computing resources from one edge node to another edge node may be needed. Rather than awaiting the mobile device reaching or even passing by a migration point and only then reactively starting the migration, the migration points may be provided to the mobile device to enable the mobile device to give a 'heads-up' notification to the orchestration function before the mobile device reaches the migration point. In response to such a notification, the orchestration function may then already proactively start the migration of the edge computing resources between edge nodes.

In a first aspect of the invention, a system may be configured as an orchestration function for a mobile network, wherein the mobile network may comprise edge nodes which may be configurable to provide edge computing resources to mobile devices. The system may comprise:
    a network interface to the mobile network;
    a processor subsystem which may at least in part orchestrate a migration of an edge computing resource for a mobile device from a first edge node to a second edge node by being configured to:
        obtain route data may be indicative of a route along which the mobile device is predicted to travel;
        based on the route data, identify one or more migration points along the route, the one or more migration points defining respective geolocations at which the second edge node is anticipated to have a better bandwidth and/or latency to the mobile device than the first edge node;
        via the network interface, send migration data to the mobile device, the migration data being indicative of the one or more migration points;
        via the network interface, receive an initiation message from the mobile device, the initiation message representing a notification of the mobile device of anticipating to reach a respective one of the migration points; and
        based on the initiation message, start the migration of the edge computing resource from the first edge node to the second edge node In a further aspect of the invention, a mobile device for a mobile network may be provided, wherein the mobile network may comprise edge nodes which may be configurable to provide edge computing resources to mobile devices. The mobile device may comprise:
    a network interface for wirelessly connecting to the mobile network via respective base stations of the mobile network;
    a processor subsystem which may be configured to:
        via the network interface, receive migration data from an orchestration function of the mobile network, wherein the migration data may be indicative of one or more migration points along a route along which the mobile device is predicted to travel, the one or more migration points defining respective geolocations at which a second edge node is anticipated to have a better bandwidth and/or latency to the mobile device than a first edge node;
        based on the migration data and a current geolocation of the mobile device, send an initiation message to the orchestration function before reaching a respective one of the migration points, wherein the initiation message may be configured to trigger the orchestration function to start the migration of the edge computing resource from the first edge node to the second edge node.

In a further aspect of the invention, a computer-implemented method may be provided for, in a mobile network which may comprise edge nodes which may be configurable to provide edge computing resources to mobile devices, at least in part orchestrating a migration of an edge computing resource for a mobile device from a first edge node to a second edge node, wherein the method may comprise:
    obtaining route data which is indicative of a route along which the mobile device is predicted to travel;
    based on the route data, identifying one or more migration points along the route, the one or more migration points defining respective geolocations at which the second edge node is anticipated to have a better bandwidth and/or latency to the mobile device than the first edge node;
    sending migration data to the mobile device, the migration data being indicative of the one or more migration points;
    receiving an initiation message from the mobile device, the initiation message representing a notification of the mobile device of anticipating to reach a respective one of the migration points; and
    based on the initiation message, starting the migration of the edge computing resource from the first edge node to the second edge node.

In a further aspect of the invention, a computer-implemented method may be provided for use with a mobile device for a mobile network, wherein the mobile network may comprise edge nodes which may be configurable to provide edge computing resources to mobile devices. The method may comprise:

receiving migration data from an orchestration function of the mobile network, wherein the migration data may be indicative of one or more migration points along a route along which the mobile device is predicted to travel, the one or more migration points defining respective geolocations at which a second edge node is anticipated to have a better bandwidth and/or latency to the mobile device than a first edge node;

based on the migration data and a current geolocation of the mobile device, sending an initiation message to the orchestration function before reaching a respective one of the migration points, wherein the initiation message may be configured to trigger the orchestration function to start the migration of the edge computing resource from the first edge node to the second edge node.

In a further aspect of the invention, computer-readable medium may be provided which may comprise transitory or non-transitory data representing a computer program. The computer program may comprise instructions for causing a processor system to perform an individual one of the aforementioned methods.

As briefly elucidated above, the above measures make use of the fact that the mobile device may follow a route which may be predicted. For example, a known technique for network-based mobility prediction may be used to predict the mobile device's route, for example by extrapolation of past route data. Another example is that the mobile device may be expected to follow a route which is planned by a route planning component. In a specific example, a passenger of a connected vehicle may have entered a destination for navigation guidance purposes, or in case of an autonomous vehicle, to enable the autonomous vehicle to autonomously drive to the destination. This route may be obtained and used by the network, and specifically by the orchestration function, to more accurately predict at which geographical location(s) along the route an edge migration may be needed. These geographical locations may then be transmitted to the mobile device, e.g., in the form of migration data.

In turn, the mobile device may, before reaching such a migration point, provide a heads-up notification to the orchestration function that the migration point is to be reached. This heads-up notification, in the form of an initiation message, may allow the orchestration function to start the migration of the edge computing resource, for example by instantiating a virtual machine (VM) from a VM image, starting a transfer of a state of the VM from the first edge node to the second edge node, etc.

More specifically, the orchestration function may identify the geographical locations as respective migration points. A migration point may represent a geolocation at which another edge node is anticipated to better serve the mobile device than an edge node previously serving the mobile device. Here, the term 'better serve' may be expressed in terms of the new (second) edge node being able to provide a higher bandwidth and/or lower latency to the mobile device than the previous (first) edge node. Moreover, the 'edge node previously serving the mobile device' may refer to the edge node which may serve the mobile device before reaching the migration point. It is noted that these migration points may be predicted along the route, and thus, the mobile device may not yet be served by this edge node but may be predicted to serve the mobile device in the future and further traveling along the planned route.

By the orchestration function obtaining the route data, the orchestration function may be enabled to predict the migration points. However, only by knowing the migration points, the orchestration function may not yet be able to optimally time the start of the migration. Namely, it may not be known when the mobile device reaches the migration point. For example, a simple extrapolation of its previous speed by the network may not suffice, as the speed may change, e.g., for a vehicle due to congestion. By providing the migration points to the mobile device, the mobile device may be enabled to provide heads-up notification to the orchestration function before reaching a respective migration point and thereby enable the orchestration function to start the migration of the edge computing resources at a suitable time. In other words, instead of trying to predict when the mobile device reaches a migration point along the route, the network, and more specifically the orchestration function, may be configured to cooperate with the mobile device so that knowledge of the mobile device, e.g., of a time of reaching a migration point, may be used to optimally time the start of the migration of the edge computing resources.

The mobile device may thus be enabled to trigger, at a suitable moment in time, the migration of the edge computing resources, but without having to have knowledge on intricacies on the migration. Rather, the mobile device may be provided with one or more geographical locations and may be configured to notify the orchestration function before a respective geographical location is reached. Such information is typically available to the mobile device, or else can be easily generated, for example utilizing the same techniques as were used for planning the route.

Compared to the mobility prediction of [1]-[4], the timing of starting the migration of the edge computing resources may be better in that the migration may be started before reaching the migration point instead of after having reached the migration point, at which time the migration may be started too late. In addition, the start of the migration may be based on the mobile device's current location with respect to the migration point, which may be more accurate than timing the start of migration without the mobile device's current location. Nevertheless, it is not needed per se for the orchestration function to know the mobile device's current location, e.g., in terms of GPS coordinates, as rather the mobile device itself may trigger the start of migration based on its current location. There may thus not be a need to transmit GPS coordinates or the like from the mobile device to the orchestration function.

The following embodiments are described with reference to the system providing the orchestration function in the network and the corresponding computer-implemented method, but may denote corresponding embodiments of the mobile device and the computer-implemented method for use with the mobile device.

In an embodiment, the processor subsystem may be configured to obtain the route data via the network interface from the mobile device, wherein the route data may be indicative of a planned route of the mobile device. Accordingly, instead of obtaining the route data from elsewhere, e.g., from a network-based mobility prediction, the orchestration function may obtain the route data directly from the mobile device. Namely, the mobile device may have such route data available or may readily generate such route data in cases when the mobile device is planned to travel on a route. For example, when the mobile device is, or is part of, a connected vehicle, a passenger of the connected vehicle may have entered a destination for navigation guidance purposes, and a local or online route planning component may then generate a route for the connected vehicle to the destination. The planned route may therefore be indicative of the route along which the connected vehicle is predicted to travel. It is noted that, in general, a planned route may be a form of a predicted route since the mobile device is likely to travel along the planned route but may still deviate from this route. By obtaining route data indicative of a planned route of the mobile device from the mobile device itself, a more accurate prediction may be obtained, for example in cases where the route of the mobile device is not simply an extrapolation of its previous trajectory. For example, when a mobile device is used in a vehicle which travels around along city streets, the vehicle may take various turns by which the actual route of the vehicle may frequently deviate from a simple extrapolation of its previous trajectory. Compared to the mobility prediction of [1]-[4], edge computing resources may be migrated to more accurately selected edge nodes since the accuracy of the predicted route may be better. This may avoid unnecessary resource allocation at other edge nodes, and/or may ensure that the migration is performed to the correct edge nodes.

In an embodiment, the mobile device may be connected to the network via respective base stations, and the processor subsystem may be configured to determine the migration points as respective geolocations at which a hand-over is anticipated to take place from a base station to another base station and at which, after the hand-over, the second edge node is anticipated to have a better bandwidth and/or latency to the mobile device than the first edge node. In many cases, the need for migrating edge computing resources may be triggered by a mobile device being handed over from one (e.g., a first) base station to another (e.g., a second) base station. Namely, while the first base station may be best served by a first edge node (or a first set of edge nodes), the second base station may be best served by a second edge node (or a second set of edge nodes). Accordingly, when the mobile device is connected to the second base station, it may be preferable for the edge computing resources to be provided by the second edge node instead of by the first edge node.

Accordingly, the orchestration function may be configured to determine the migration points as geolocations at which a handover is anticipated to take place from one base station to another base station and at which, at the same time, a migration of edge computing resources is anticipated to be needed in view of a second edge node being able to better serve, e.g., in terms of bandwidth and/or latency, the mobile device when connected to the second base station than a previously serving edge node.

In an embodiment, the processor subsystem may be configured to:
determine a time for the mobile device to send the initiation message, wherein the time is defined as time period before reaching the respective one of the migration points; and
provide the time period to the mobile device.

In accordance with this embodiment, the orchestration function may determine the time at which the mobile device is to send the heads-up notification, e.g., in form of the initiation message, namely as a time period before reaching a respective migration point. For example, the orchestration function may specify that the mobile device is to send the heads-up notification 5 minutes, or 1 minute, or 30 seconds, or 10 seconds, etc. before reaching a respective migration point. The mobile device itself may estimate when it is due to reach the migration point, e.g., based on simple extrapolation of its current speed or based on an estimate of a route planning component, and may thus timely send the heads-up notification. Accordingly, the orchestration function may start the migration of the edge computing resources at a more optimal moment in time, e.g., not too early to avoid unnecessary resource allocation and not too late to avoid the mobile device having to continue to use the first edge node and thereby being subjected to high latency and/or low bandwidth.

In an embodiment, the processor subsystem may be configured to determine the time based on a type of the edge computing resource to be migrated to the second edge node. The migration of edge computing resources may take time which may depend on the type of edge computing resources. For example, if a sizable VM is to be transferred, this may take more time than if simply the current state of the VM is to be transferred. To be able to complete the migration at the right time, the orchestration function may determine the time at which the mobile device is to send the heads-up notification before reaching the migration point based on the type of edge computing resource to be migrated. This may allow the migration of different types of edge computing resources to be started and completed in a timely manner.

In an embodiment, the processor subsystem may be configured to, in response to changes in network infrastructure or network resource allocation:
re-determine the one or more migration points based on the changes in the network infrastructure or in the network resource allocation, thereby obtaining updated migration data; and
send the updated migration data to the mobile device.

Changes in network infrastructure or network resource allocation may affect the ability of edge nodes to serve mobile devices. The orchestration function may be aware of such changes, for example based on communication with other network functions, and may thus redetermine the migration points based on such changes, for example in a continuous or periodic manner or in response to notification of changes. For example, if the second edge node experiences high resource allocation due to which the first edge node will continue to better serve the mobile device even after an original migration point, the original migration point may be simply deleted. Another example is that changes in network infrastructure may mean that an additional edge node has become available along the route where previously no migration point had been planned. Accordingly, a migration point may be added along the route.

In an embodiment, the processor subsystem may be configured to, in response to the initiation message, send resource data to the mobile device identifying the second edge node to which the edge computing resource is to be migrated. To facilitate the migration to the second edge node, the orchestration function may identify the second edge node to the mobile device, for example by specifying a network address or similar type of network identifier. Accordingly, the mobile device may timely reroute its traffic, e.g., by sending raw sensor data to be processed, from the first edge node to the second edge node, which may further facilitate the seamless migration.

In an embodiment, the processor subsystem may be configured to start the migration of the edge computing resource from the first edge node to the second edge node by transferring a virtual machine image of a virtual machine from the first edge node to the second edge node. The transfer of virtual machine images may take time in view of their size. By starting to transfer such images in response to the heads-up notification received from the mobile device, and thus before the mobile device actually reaches the migration point, the transfer may be completed or at least well underway when reaching the migration point. This may further facilitate the seamless migration.

In an embodiment, the processor subsystem may be further configured to, at least one of a group of:
  transfer a state of the virtual machine from the first edge node to the second edge node;
  based on the virtual machine image, start the virtual machine on the second edge node; and
  reroute network traffic of the mobile device from the first edge node to the second edge node In addition or alternatively to transferring a virtual machine image, the orchestration function may take any individual or combination of the above-mentioned actions in response to receiving the heads-up notification from the mobile device.

The following embodiments are described with reference to the mobile device and the computer-implemented method for use with the mobile device, but may denote corresponding embodiments of the system providing the orchestration function in the network and the corresponding computer-implemented method.

In an embodiment, the initiation message may comprise at least one of a group of:
  an identification or characterization of the edge computing resource;
  the migration point which is anticipated to be reached;
  an absolute or relative time of reaching the migration point; and
  the current geolocation of the mobile device.

Including such types of data in the initiation message may assist the orchestration function in orchestrating the migration of edge computing resources. For example, the mobile device may identify the edge computing resource being used, e.g., in terms of type, which may enable the orchestration function to adapt the migration to the edge computing resource. Another example is that the mobile device may explicitly indicate the migration point which is to be reached, which may avoid the orchestration function having to otherwise estimate which migration point is to be reached. Yet another example is that the absolute or relative time of reaching the migration point may assist the orchestration function in timely starting the migration, e.g., not too late but also not too early. Similarly, the current geolocation of the mobile device may enable the orchestration function to estimate when the migration point is to be reached which may again enable the orchestration function to timely start the migration.

In an embodiment, the processor subsystem may be further configured to:
  generate route data indicative of a planned route along which the mobile device is planned to travel; and
  via the network interface, send the route data to the orchestration function.

As described earlier, the mobile device may generate route data in cases when the mobile device is planned to travel on a route. For example, when the mobile device is, or is part of, a connected vehicle, a passenger of the connected vehicle may have entered a destination for navigation guidance purposes, and a local or online route planning component may then generate a route for the connected vehicle to the destination. The planned route may therefore be indicative of the route along which the connected vehicle is predicted to travel. In general, the mobile device may obtain the route data from a route planning component, which may be executed by the mobile device but also elsewhere. By providing the route data to the orchestration function, the orchestration function may be enabled to migrate edge computing resources to more accurately selected edge nodes since the accuracy of the predicted route may be better. This may avoid unnecessary resource allocation at other edge nodes, and/or may ensure that the migration is performed to the correct edge nodes.

In an embodiment, the route data may comprise at least one of a group of:
  a list of waypoints defining geolocations which characterize at least part of the planned route;
  a list of track points defining geolocations which together form a track between at least two subsequent waypoints;
  an identifier of a destination of the planned route; and
  a current geolocation of the mobile device.

There may be various ways of providing route data to the orchestration function, for example as list of waypoints, a list of track points or as a combination of an identifier of the destination of the planned route and the current geolocation of the mobile device. The latter combination of data may enable the orchestration function to reconstruct the planned route, e.g., using a route planning component.

In an embodiment, the processor subsystem may be configured to:
  based on the migration data, identify a notification point which represents a geolocation at which the initiation message is to be sent; and
  send the initiation message when the current geolocation of the mobile device reaches the notification point.

The mobile device may determine when to send the notification of reaching a migration point in the near future by explicitly identifying a geolocation which is located on the route before the migration point, e.g., in the form of a notification point, and sending the heads-up notification in the form of the initiation message to the orchestration function when reaching the notification point. This may be an efficient way of enabling the mobile device to determine when to send the notification point, as the mobile device may simply compare its current geolocation to a (list of) notification point(s) and send the initiation message upon reaching a respective notification point.

In an embodiment, the processor subsystem may be configured to send the initiation message at a time which is defined as time period before reaching the respective migration point. For example, the time period may be defined by the orchestration function, e.g., as part of the migration data, or may be determined by the mobile device itself, e.g., based on a type of edge computing resource to be migrated.

In an embodiment, the migration data may comprise at least one of a group of:
  a geolocation defining a migration point;
  a geolocation and a radius defining a migration point, wherein the migration point is reached by arriving within the radius of the migration point; and
  a set of at least two geolocations defining a line of migration points, wherein the line of migration points is reached by crossing the line.

There may be various ways of defining a migration point, for example as a single geolocation or as a combination of a geolocation and a radius (e.g., defining a circle) or as a line of migration points. The latter two may have as an advantage that they allow (lateral) deviations of the mobile device with respect to the planned route.

In an embodiment, the migration data may comprise at least two migration points, and the processor subsystem may be configured to identify the migration point for which the initiation message is sent in the initiation message.

In an embodiment, the processor subsystem may be configured to, when a change in the planned route occurs, obtain updated route data indicative of an updated route along which the mobile device is planned to travel and send the updated route data to the orchestration function.

In an embodiment, the processor subsystem may be configured to send an announcement message to the orchestration function, wherein the announcement message may be configured to trigger the orchestration function to prepare the migration of the edge computing resource from the first edge node to the second edge node. Such preparation may for example involve downloading an image, such as a VM image or a container image, to the second edge node, whereas starting the migration may involve instantiating (e.g., by starting) a VM based on the VM image, transferring a state of the VM, etc. This may also apply to application executables which represent or provide edge computing resources. Here, the preparation of the migration may involve transferring the application executable to the second edge node and the starting of the migration may involve configuring and executing the application executable.

In accordance with this embodiment, the mobile device may notify the orchestration function of approaching a migration point in two stages. As described elsewhere, the mobile device may send an initiation message before reaching a migration point to trigger the orchestration function to start ('initiate') the migration of the edge computing resources. In addition, the mobile device may also send a preceding notification to the orchestration function, e.g., an announcement message, which may precede the initiation message in time. The announcement message may be used by the mobile device to provide the orchestration function with an estimate of an arrival time at a migration point. More specifically, the announcement message may comprise or may be indicative of an arrival time at a migration point, or it may be predefined that the mobile device sends the announcement message at a certain time before reaching the migration point. The orchestration function may use this information to prepare the migration of the edge computing resources. By being provided with this announcement message, the orchestration function may be provided with more freedom to make the necessary preparations for the migration, for example, when the load on the edge node is lower or there is less competing network traffic. Advantageously, when all or most of the sizable data is already available at the second edge node, e.g., a VM image or container image or a sizable application executable, the subsequent start of the migration, e.g., by instantiating the VM or container on the basis of its image, executing the application executable, etc., may be (much) faster.

It will be appreciated by those skilled in the art that two or more of the above-mentioned embodiments, implementations, and/or aspects of the invention may be combined in any way deemed useful.

Modifications and variations of any one of the systems, methods and/or computer programs, which correspond to the described modifications and variations of another one of these systems, methods and/or computer programs, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
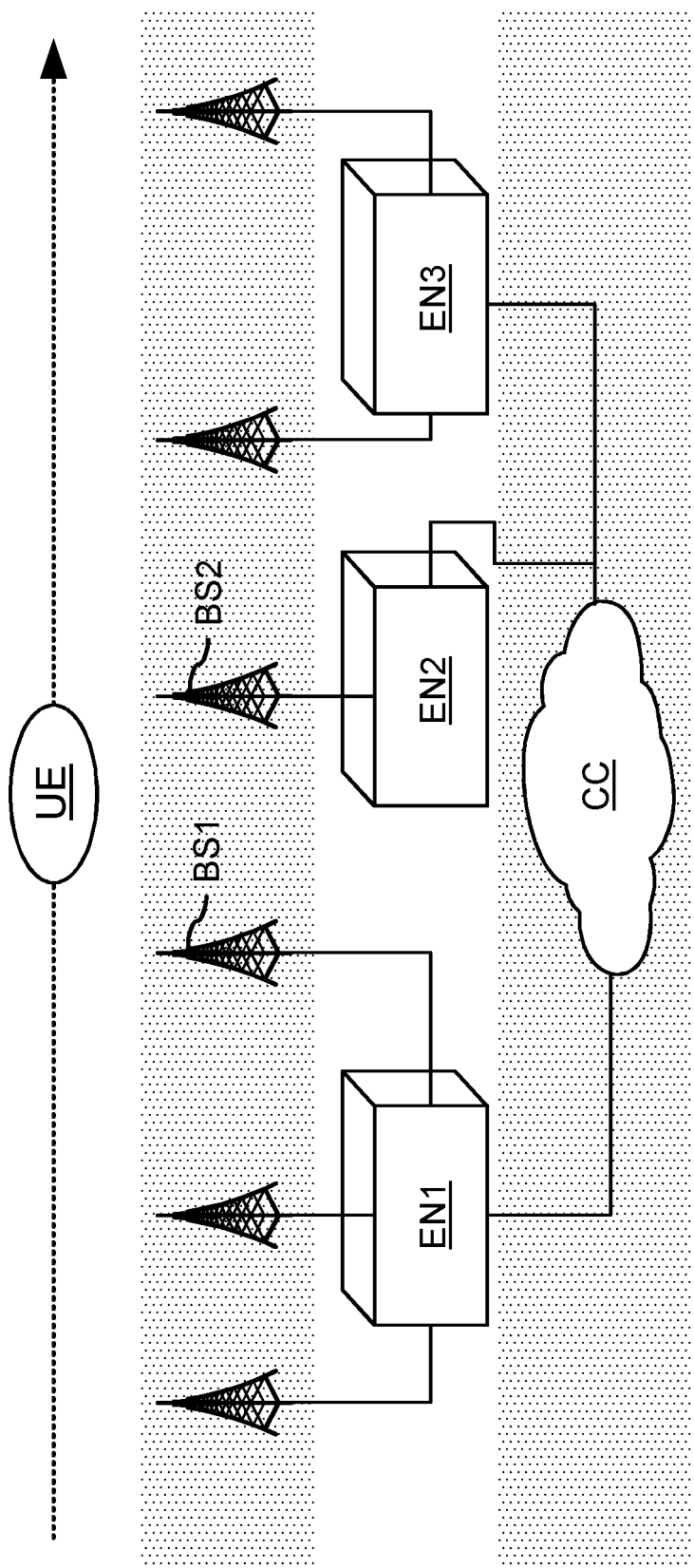
FIG. 1 shows a mobile UE moving between base stations that are on its route, in which a first group of base stations are served by a first edge node and a second group of base stations are served by a second edge node.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

AMF access and mobility management function
BSX base station X
CC central cloud
EM edge migration process
ENX edge node X
MME mobility management entity
OF orchestration function
QoS quality of service
UE user equipment
VM virtual machine
VM-REPO virtual machine repository
1, 2, 4, 7, 9-11 steps in message exchange
20 migration line
30 coverage area of base station
   served by source edge node
40 coverage area of base station
   served by destination edge node
100 system configured as orchestration function
110 network interface
120 processor subsystem
130 data storage
200 user equipment, mobile device
210 network interface
220 processor subsystem
300 computer readable medium
310 non-transitory data
1000 exemplary data processing system
1002 processor
1004 memory element
1006 system bus
1008 local memory
1010 bulk storage device 1012 input device
1014 output device
1016 network adapter
1018 application

DETAILED DESCRIPTION OF EMBODIMENTS

FIG. 1 shows a mobile UE (also elsewhere referred to as 'mobile device' or simply as 'UE') moving between base stations that are on its route, in which a first group of base stations are served by a first edge node EN1 and a second group of base stations are served by a second edge node EN2. For example, it can be seen that the UE may at one moment in time along its route be connected to a first base station BS1 which may be served by the first edge node EN1 and at a later moment in time connected to a second base station BS2 which may be served by a second edge node EN2. When switching, in terms of wireless connectivity, to the second base station BS2, it may be preferred to use edge computing resources provided by the second edge node EN2 since the mobile UE's connection via the second base station BS2 to the first edge node EN1 may be suboptimal, e.g., in terms of bandwidth and/or latency, in that the connection may for example be routed via the central cloud CC.

Providing suitable edge computing resources at the second edge node EN2 may involve migrating the edge computing resources from the first edge node EN1 to the second edge node EN2. This may for example involve one or more entities, for example entities in the central cloud CC, obtaining a Virtual Machine (VM) image, instantiating a VM, transferring VM state from the source edge EN1 to the destination edge EN2, and updating routing to the VM. The migration of edge computing resources is known per se, but the timing of migrating the edge computing resources from one edge node to another edge node may be inadequately addressed by the prior art.

To better address the timing of starting the migration of the edge computing resources, an orchestration function (OF, not shown in FIG. 1) may be provided and the UE may be configured to interact with the OF. The OF may be configured to determine migration points on the route of the UE, such that the UE can provide a heads-ups notification to the OF in the form of an initiation message which triggers the OF to start the migration of edge computing resources so that the migration may be completed in a timely manner. Thereby, use is made of information available in the UE's knowledge realm (e.g., the UEs physical location and resource needs) and in the operator's knowledge realm (e.g., the network infrastructure and edge deployments).

The following embodiments describe the route data being obtained from the mobile device, and in particular as route data which is indicative of a planned route of the mobile device. For example, the mobile device may plan the route using a local or remote ('online') route planner and may transmit route data which is indicative of the route to the orchestration function. However, this is not a limitation, in that the orchestration function may also obtain route data indicative of the route along which the mobile device is predicted to travel in other ways, for example using network-based mobility prediction, as known per se. For example, such network-based mobility prediction may be based on the serving base stations, serving edge nodes, or on GPS information which may be based on actual or historic mobility traces. In yet another embodiment, the orchestration function may obtain route data indicative of a planned route from a route planning entity, e.g., a server configured to generate routes for mobile devices, instead of obtaining such route data directly from the mobile device.

Figure 2:
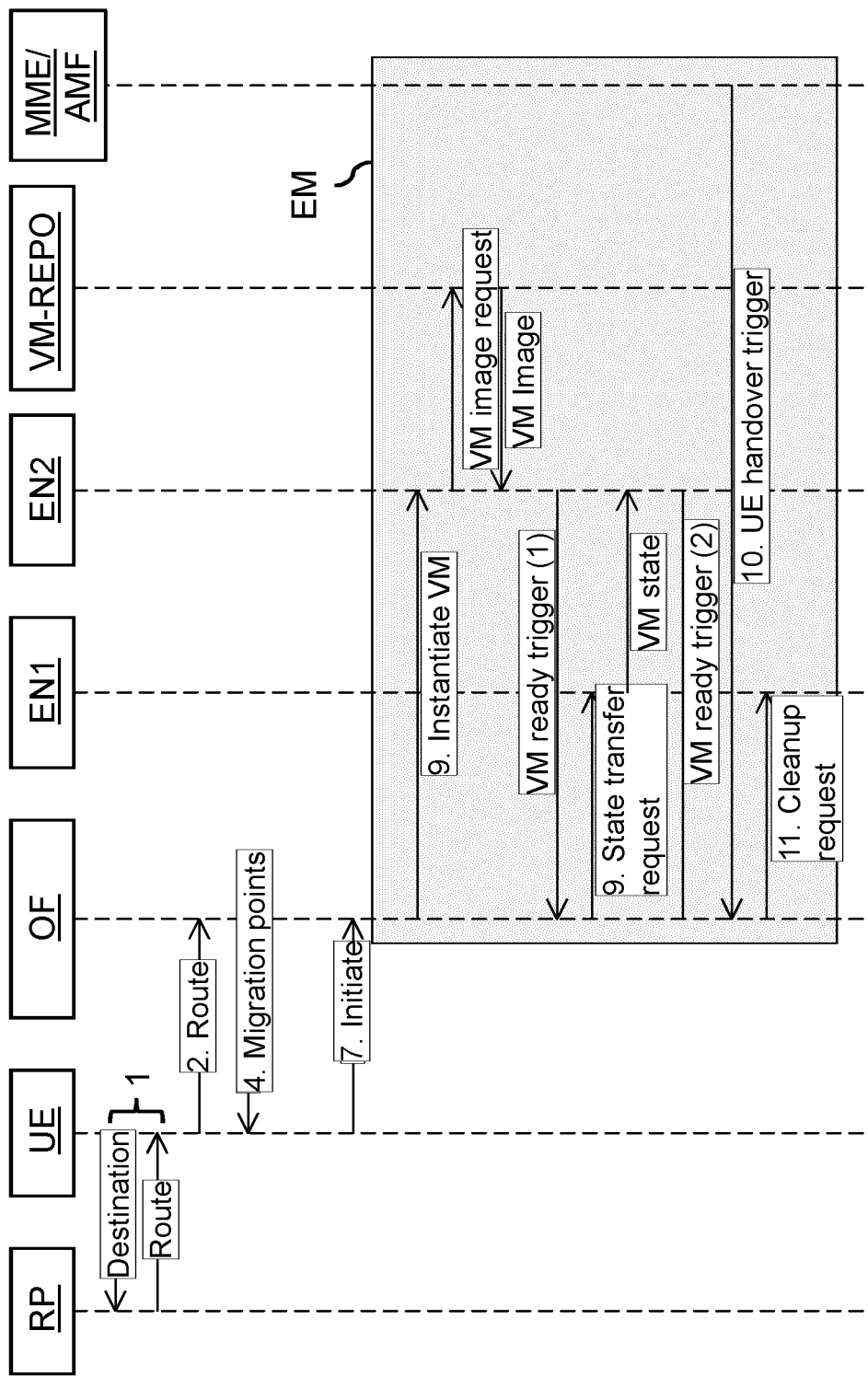
FIG. 2 shows a message exchange between an orchestration function, the mobile UE and other entities to orchestrate a migration of edge computing resources from a first edge node to a second edge node.

FIG. 2 shows a message exchange between the orchestration function OF, the mobile UE and other entities to orchestrate a migration of edge computing resources from a first edge node EN1 to a second edge node EN2. This message exchange may involve the following messages and steps (of which some steps are not shown in FIG. 2, for example by being internal steps of a respective entity and not a message exchanged between entities; FIG. 2 shows steps 1, 2, 4, 7, 9-11):

1. The UE may determine a route to a destination point. The UE may for example make use of an offline or online route planning tool or application, which is depicted in FIG. 2 as a separate entity 'RP' but which may also be an internal component of the UE. The UE may thereby obtain its route as route data, which may be in an appropriate format, such as the XML-based GPS Exchange Format (GPX).

2. The UE may send the route data to the OF. This may also cause the UE to register with the OF.

3. The OF may determine which base station(s) the UE is likely to be connected to along the route, and by which edge nodes these base stations are served. For each or a subset of combinations of two base stations that a UE is expected to consecutively cross (e.g., transition between their coverage areas) along its route and which are best served by different edge nodes, the OF may add a location at approximately the crossover between the two base stations to a list of migration points, where a migration point may represent a location which is encoded in a format which is parse-able and processable by the UE (e.g., a physical geolocation)

4. The OF may provide the UE with the list of migration points by sending migration data to the UE.

5. In some embodiments, the OF may register triggers for each migration point, such that the OF may be notified when a UE is handed over to a base station served by another edge node. For example, in an LTE mobile network, the OF may register such triggers at the MME (Mobile Management Entity), and in a 5G mobile network, at the AMF (Access and Mobility Management Function).

6. Based on the route data and resource needs of the UE, the UE may determine when to provide the heads-up notification in the form of the initiation message to the OF. These points may be termed 'notification points', and may, but do not need to be, expressed in a similar format as the migration points.

7. When reaching a notification point, the UE may provide the initiation message to the OF, which may for example contain a description of the edge computing resources needed by the UE to be available upon migration.

8. In some embodiments, the OF may provide the UE with additional information about the edge computing resources in the destination edge node EN2, and the network path to the destination edge node EN2.

9. The OF may start the migration of the edge computing resources, e.g., by instantiating one or more VMs and optionally by initiating a state transfer. This may involve requesting a VM image from a VM repository (VM-REPO in FIG. 2) to be downloaded to the destination edge node EN2.

10. When the UE is handed over to the new base station, whose trigger may be provided by the MME or the AMF, routing of traffic from the UE to the destination edge EN2 in the network may be configured.

11. The source edge node EN1's VM may be terminated and cleaned up.

By way of the above steps, the OF may inform the UE where on its route a migration is likely to occur, but may leave the timing of starting the migration to the UE, in that the migration may only be started when an initiation message is received from the UE. This way, the UE may use information which may be available to itself and not the OF (e.g., current speed, traffic, etc.) to optimally time the start of migration. A well-timed start may prevent edge computing resources being blocked (too early start) or edge computing resources being not yet available (too late start). Additionally, because the UE may be made aware of edge migrations, e.g., by way of the migration points, an application running on the UE may also prepare for a migration, for example in order to reduce the potentially negative impact of lack of connectivity during the migration.

If a destination or route of the UE changes, the UE may repeat the process described above. Accordingly, the OF may determine new migration points for the new route, which may be provided to the UE to 'override' the previously communicated migration points. Similarly, when network or infrastructure changes occur, the OF may redetermine the migration points and communicate the new migration points to the UE.

Exchanging Route Information

The UE may obtain route data indicative of its planned route various ways. For example, the UE may obtain its route through online (e.g., Google Maps) or offline (e.g., TomTom) route planner tools. Typically, these tools provide detailed route planning information, including a precise definition of track points and arrival time information. The UE may communicate such type of information (e.g., the start- and destination waypoints followed by a list of trackpoints that define the route) to the OF, for example by making an HTTP POST request at a RESTful API endpoint of the OF.

Example 1. An example of the route information data or in short route data provided by the UE to the OF in the GPS eXchange Format (GPX) is provided below. Here, the start and destination are specified as waypoints, where a waypoint is defined as a latitude/longitude pair according to the geographic coordinate system. Following the start and destination is a list of track points which define the expected route of the UE. Similar to waypoints, trackpoints are defined as latitude/longitude combinations.

```
POST / route HTTP/1.1
Host: of.example
Content-Type: application/gpx+xml
Content-Length: 2031
<?xml version="1.0" encoding="UTF-8">
<gpx xmlns="http://www.topografix.com/GPX/1/1">
    <wpt lat="52.1500559" lon="4.777359">
        <name>Nieuwkoop</name>
        <desc>Nieuwkoop, Netherlands</desc>
    </wpt>
    <wpt lat="52.0194446" lon="4.431991">
        <name>Pijnacker</name>
        <desc>Pijnacker, Netherlands</desc>
    </wpt>
    <trk>
        <name>Nieuwkoop to Pijnacker</name>
        <number>1</number>
        <trkseg>
            <trkpt lat="52.1501774" lon="4.77697">
                <name>TP001</name>
            </trkpt>
            <trkpt lat="52.1501774" lon="4.77697">
                <name>TP002</name>
            </trkpt>
            <trkpt lat="52.1501774" lon="4.77697">
```

-continued

```
                <name>TP003</name>
            </trkpt>
            ...
        </trkseg>
    <trk>
</gpx>
```

In another example, precise route information may not be available at the UE. In this case, the UE may for example communicate start and destination waypoints, followed by a list of essential route points, e.g., point at which the route changes or may change, such as turns forks, junctions, etc. along the route. Route definition through a list of route points instead of using trackpoints may be less precise, because route points are only essential trackpoints. However, when a Multi-access Edge Computing (MEC)-based cloud serves a larger region covered by multiple base stations, e.g., eNodeBs, this level of detail would be sufficient.

In another example, the UE may communicate a destination and a start of its route or its current location. The destination, start or current location may be provided in various ways, such as a geographic coordinate, a street address, etc. This may enable the OF to plan the most likely route of the UE, e.g., using a route planning component such as an online or off-line route planning tool or application.

In yet another example, the UE may only communicate a (short) list of waypoints, for example the start- and destination waypoints, optionally combined with a number of waypoints on the route towards the destination. In this example, the OF may again use online or offline route planning tools to estimate the route of the UE.

The providing of route information to the OF, e.g., in the form of route data, may initiate a new session with the OF, meaning that it may trigger cooperation between the UE and OF until the provided destination is reached. However, the route (e.g., destination and list of trackpoints/waypoint) provided by the UE does not have to be fixed during the session. If the UE diverges from the route it communicated to the OF, the UE may provide updated route data to the OF. The new route data may define a current location of the UE as the start, a possible updated destination location, and/or a new list of trackpoints/waypoints. An example of an update of the route registration at the OF may be an HTTP PUT request to a RESTful API endpoint of the OF. Note that a PUT request may indicate that it is an update to an existing resource (i.e., the route data), and that it is to replace the route that was communicated before.

Example 2. An example of an update of an existing route, where the update defines a route through a list of waypoints, where the list of waypoints includes a start waypoint, an intermediate waypoint, and a destination waypoint, in the common GPX format, is given below. In this example, the update is executed as HTTP PUT to a RESTful API at the OF, where the URL contains the identifier of the current route.

```
PUT / route/LIzk96YqAxuu71V6mQqH-ZgXH7rziCfeuPuenn6j0 HTTP/1.1
Host: of.example
Content-Type: appliation/gpx+xml
Content-Length: 811
<?xml version="1.0" encoding="UTF-8">
<gpx xmlns="http: //www.topografix.com/GPX/1/1">
    <wpt lat="52.1500559" lon="4.777359">
        <name>Start</name>
```

-continued

```
        <desc>Nieuwkoop, Netherlands</desc>
    </wpt>
    <wpt lat="52.109626" lon="4.458512">
        <name>Intermediate 01</name>
        <desc>Leidschendam, Netherlands</desc>
    </wpt>
    <wpt lat="52.0194446" lon="4.431991">
        <name>Destination</name>
        <desc>Pijnacker, Netherlands</desc>
    </wpt>
</gpx>
```

Providing Migration Points

The response from the OF to the UE after providing the OF with the route data may be a list of migration points. A migration point may be defined as the expected location where a UE is expected make the handover from one base station to another base station, and where the two base stations are best served by different edge nodes, e.g., in terms of bandwidth and/or latency to a respective edge node.

To determine the migration points, the OF may match the physical location of the UE, being either a current location or a future location along the route, to a serving base station, and from the base station to a serving edge node. In one example, the mapping may be performed on the basis of a static configuration. The first mapping, e.g., between physical location and the base station, may for example be performed with a coverage map, where the number of antennas, the antenna types, direction, and transmission power may determine the coverage area of a base station.

The second mapping, e.g., from base station to edge node, may depend on where and how edge computing is deployed. In case of a hyperlocal edge deployment, where the edge node is located at the base station, the mapping between base station to edge node may be one-to-one. When one edge node serves multiple base stations, the OF may make the mapping based on the network layout and topology, for example selecting an edge node that is closest to the base station as serving edge node.

In another example, the mapping between the UE location and the serving base station may still be static, but the mapping between base station and edge node may be dynamic. In this example, the OF may select the edge node on the basis of a distance from the base station, the availability of resources at one of the edge locations, and/or on the basis of application requirements. An example of the latter is that the OF may select to serve UEs with applications with an ultra-low latency or very high bandwidth requirements by edge nodes closest to the base station, other less critical application on edge nodes that serve a larger number of base stations.

In general, a migration point may be specified as a point on the route that is provided by the UE. This point may be defined with a small radius around the point, and may in general be specified in a way that it is understandable to the UE, for example as longitude, latitude tuple. Defining the migration point as a location point may in general be possible when the route of the UE is relatively precisely defined and the UE is expected to relatively precisely cross the location point. For example, if the UE is or is part of a vehicle traveling on an intercity road network, it may be possible to define the migration point as a location point on one of the roads along the planned route since the UE is not expected to deviate from the roads, e.g., to drive off-road.

Figure 3:
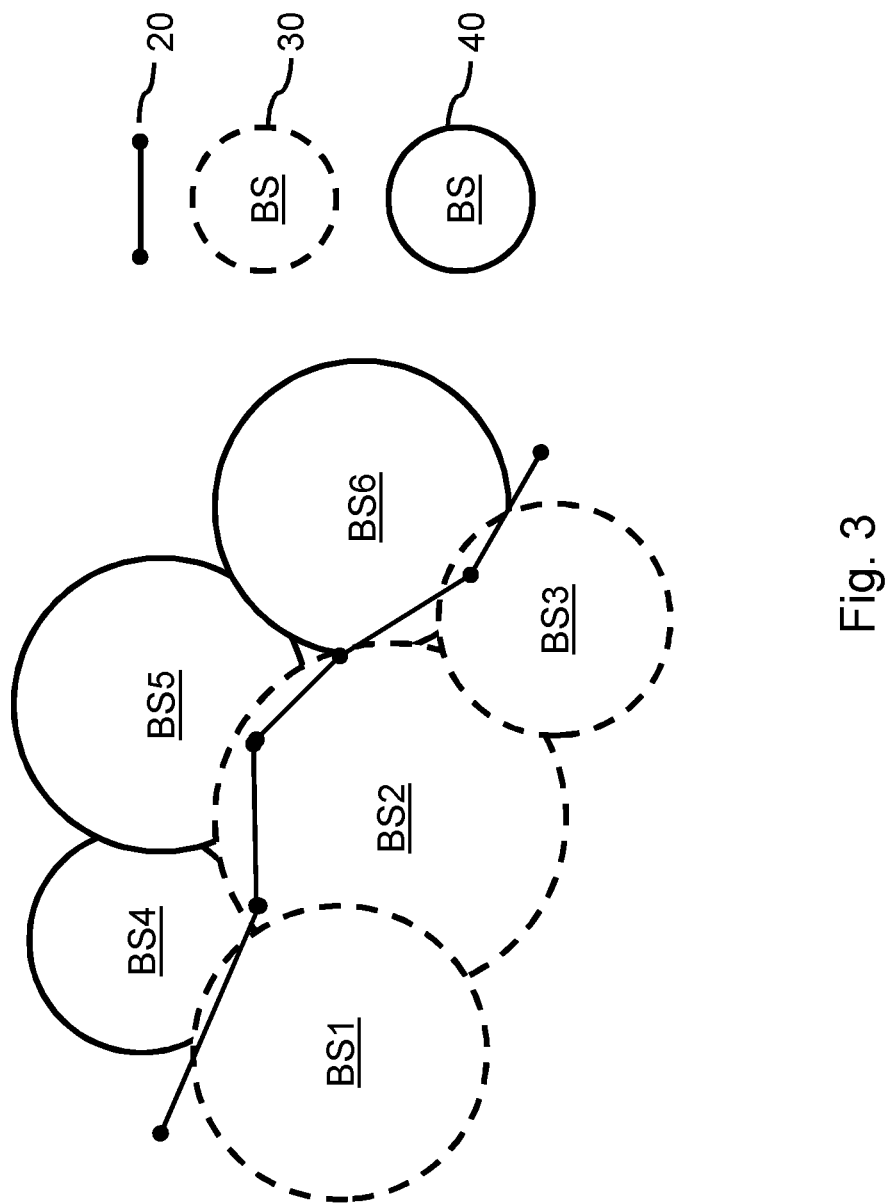
FIG. 3 shows an example of migration data defining a set of at least two geolocations defining a line of migration points and thereby a migration line.

FIG. 3 shows an example of migration data defining a set of at least two geolocations defining a line of migration points and thereby a migration line 20, e.g., in the form of a list of physical locations. The migration line 20 may roughly be placed between the coverage areas 30 of base stations BS1-BS3 which may each be served by a first edge node (not shown in FIG. 3), and the coverage areas 40 of base stations BS4-6 which may each be served by a second edge node (also not shown in FIG. 3). When traveling from the coverage area 30 of one of base stations BS1-BS3 to the coverage area 40 of one of base stations BS4-BS6, the edge computing resources for the UE may be migrated from the first edge node to the second edge node. For that purpose, the UE may interpret the list of migration points as a line 20, which when intersected by the UE, causes the UE to send an initiation message to the OF.

Migration lines may be appropriate when the route of the UE is less precisely defined, as it may not require the OF to precisely determine each possible point along which the UE may be handed-over between base stations. It is noted that a migration line may be provided for each respective migration from source edge node to destination edge node. When the UE can migrate to different edge nodes, the OF may have to provide different migration points, or different sets of migration points as different migration lines, for each different destination edge node.

The UE may indicate the migration point in its initiation message, which may enable the OF to initiate a migration to the appropriate destination edge node upon receiving the initiation message. In other examples, the UE may not indicate the migration point in its initiation message, and the OF may instead estimate which migration point is crossed, e.g., based on the route data and a time elapsed since receiving the route data, or based on a current location of the UE which may be provided to the OF, e.g., as part of the initiation message or via a different mechanism. An example of such a different mechanism is the determining of the current location of the UE by identifying which of the base stations is currently serving the UE.

Example 3. An example of a response from the OF containing a list of migrations points is given below, where the migration points are specified as a migration line, namely by being assigned a common identifier instead of each migration point having a separate identifier. The response further comprises an indication that the UE should give the heads-up by sending the initiation message at least 180 seconds before reaching the migration line. In this example, the list of migration points is provided as an HTTP response to a request at a RESTful API at

```
HTTP/1.1 200 OK
Content-Type: application/json
Content-Length: 7912
Connection: close
Location: https://of.example/route/LIzk96YqAxuu71V6mQqH-
ZgXH7rziCfeuPuenn6j0
{
    "route": "LIzk96YqAxuu71V6mQqH-ZgXH7rziCfeuPuenn6j0",
    "migration-points": [
        {
            "identifier": "nPjZ3TPoapnGHqnCs6Ib-
jYTaEGgVaZP55pymCT6T",
            "location": [
                {
                    "latitude": "52.109621",
                    "longitude": "4.458511"
                },
                {
                    "latitude": "52.109692"
                    "longitude": "4.458604"
                }
```

-continued

```
    ],
    "heads-up-interval": "180S"
    },
    ...
  ]
}
``` the OF. The "Location" response header contains the URL that the UE should use as the base for providing the heads-up.

The time at which the UE is expected to send the initiation message to the OF before reaching a respective migration point may be statically defined, for example always five minutes, or 1 minute, or 30 seconds or 10 seconds ahead of reaching the migration point. In another example, the time when to send the initiation message may depend on the type of edge computing resources to be migrated, for example on the type virtualization technology that is used to run the application at the edge node. For example, initializing a virtual machine may take more time (typically in the order of minutes) than starting a Linux container or Docker container (typically in order of seconds). The UE may thus provide the heads-up by sending the initiation message at a time before reaching the migration point which depends on the virtualization technique, or in general on the type of edge computing resources to be migrated.

In yet another example, the time at which the UE is expected to send the initiation message to the OF before reaching a respective migration point ('timeframe') may be dynamically determined, for example by the OF. This may allow the OF to set the timeframe depending on, for example, the type virtualization technology, the load of the edge nodes, depending on whether the application image is already available, the expected amount or speed of data transfer from the source edge node to the destination edge node, etc. The OF may provide the timeframe to the UE as number, or alternatively, as a function of the requested resources. This may be particularly well suited for cases where the UE initiates the edge computing session, and the OF is unaware of the resource requirements set the by UE (e.g., they are not pre-defined and negotiated by an application provider, but are request on-demand by the UE).

Providing the Initiation Message

The UE may be configured to provide the OF with a heads-up before reaching the migration point in the form of an initiation message. The initiation message may contain certain information, for example to identify the migration point, the location of the UE and/or the expected time the UE will pass the migration point. An example of an initiation message may be an HTTP POST request at a RESTful API endpoint of the OF.

```
POST /route/LIzk96YqAxuu71V6mQqH-ZgXH7rziCfeuPuenn6j0/headsup
HTTP/1.1
Host: of.example
Content-Type: application/json
Content-Length: 393
{
  "heads-up": {
    "migration-point": "nPjZ3TPoapnGHqnCs6Ib-jYTaEGgVaZP55pymCT6T",
    "current-time": "2019-04-25T14:26:05Z",
    "arrival-time": "2019-04-25T14:31:05Z",
    "current-location": {
    "latitude": "52.109626",
    "longitude": "4.458512"
    }
  }
}
```

Example 4. An example of an initiation message in HTTP POST format provided by a UE at a RESTful API of the OF is given above. The initiation message refers to a migration point earlier communicated by the OF to the UE. The initiation message is formatted in the common JSON format.

In another example, the initiation message may also include a definition of the desired edge computing resources. This may allow the UE to specify or change the edge computing resources when needed and may let the UE initiate edge computing sessions. In such an initiation message, the UE may for example specify the format of the VM image that should be instantiated at the destination edge node (e.g., VM image with installation script, VM disk image, Container, Lambda function), a location where the image could be obtained (e.g., URL, Docker hub location), and an instance type (e.g., a specification of number of CPU, RAM amount and disk space, or by referring to a predefined instance type).

Example 5. An example is given below of an initiation message in HTTP POST format provided by the UE at a RESTful API of the OF in the common JSON format. This initiation message also includes a specification of the requested resources, specifying the QEMU virtual disk image and details of the computing instances (2 CPUs, 2048 MB RAM, 10 GB disk, and GPU acceleration enabled).

```
POST /route/LIzk96YqAxuu71V6mQqH-ZgXH7rziCfeuPuenn6j0/headsup
HTTP/1.1
Host: of.example
Content-Type: application/json
Content-Length: 393
```

```
{
  "heads-up": {
    "migration-point": "nPjZ3TPoapnGHqnCs6Ib-jYTaEGgVaZP55pymCT6T",
    "current-time": "2019-04-25T14:26:05Z",
    "arrival-time": "2019-04-25T14:31:05Z",
    "current-location": {
    "latitude": "52.109626",
    "longitude": "4.458512"
    "instance": {
      "format": "qcow2",
      "image": "https://exmaple.org/images/example.qcow2",
      "cpus": 2,
      "ram": 2048,
      "disk": 10000,
      "gpu": true
    }
  }
}
```

Two-Stage Notification

Figure 4:
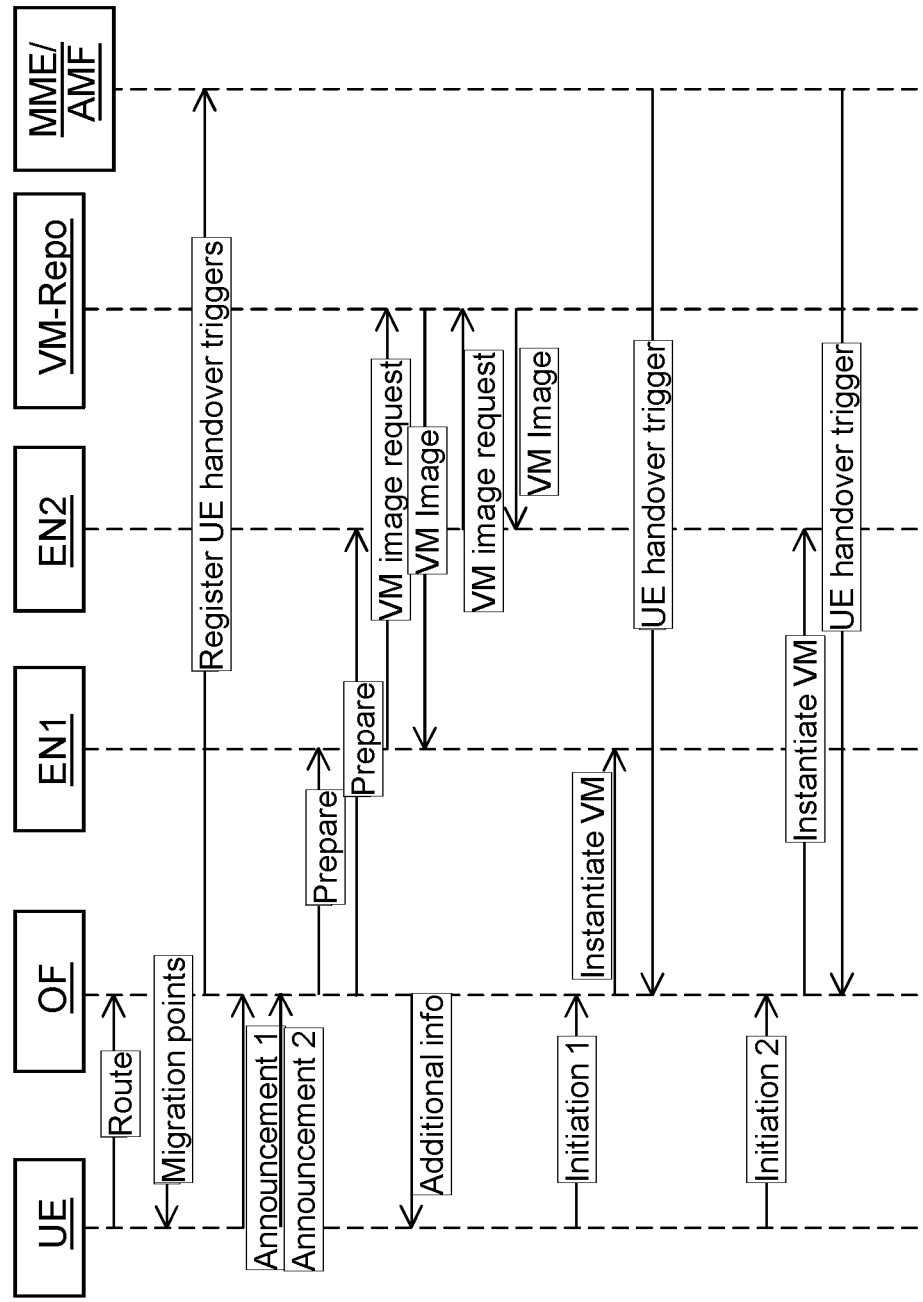
FIG. 4 shows a message exchange in which the mobile UE first sends an announcement message and later sends an initiation message to the orchestration function to trigger the orchestration function to first prepare the migration of edge computing resources and then later start the migration of edge computing resources.

FIG. 4 shows a message exchange in which the mobile UE first sends an announcement message and later sends an initiation message to the orchestration function to trigger the orchestration function to first prepare the migration of edge computing resources and then later start the migration of edge computing resources This message exchange may relate to the following. The UE may notify the OF of approaching a migration point in two stages. As described elsewhere, the UE may send an initiation message before reaching a migration point to trigger the OF to start ('initiate') the migration of the edge computing resources. In addition, the UE may also send a preceding notification to the OF, e.g., an announcement message, which may precede the initiation message. The announcement message may be used by the UE to provide the OF with an estimate of an arrival time at a migration point. The OF may use this information to prepare the migration of the edge computing resources. Such preparations may involve downloading VM images and other data that may have to be available at the destination edge node but which is yet not available at the destination edge node. For example, one or more VM images may have to be downloaded from a VM repository or from a source edge node. The initiation message may then be used by the OF to instantiate the VM based on the VM image and to start the migration to the destination edge node, e.g., by transferring a state from a source edge node.

FIG. 4 shows a possible order of events for the two-stage notification, indicating that the announcement can be sent in advance, and in the case of EN2, even before an initiation message is sent for migration to a preceding edge node EN1. In this example, the UE announces migration to edge nodes EN1, EN2 after which the OF prepares the edge nodes by downloading the VM images from the VM repository VM-REPO. The preparations are followed by two initiations of the migration, which comprises instantiating the respective virtual machines on the respective edge nodes.

Data Processing Entities

Figure 5:
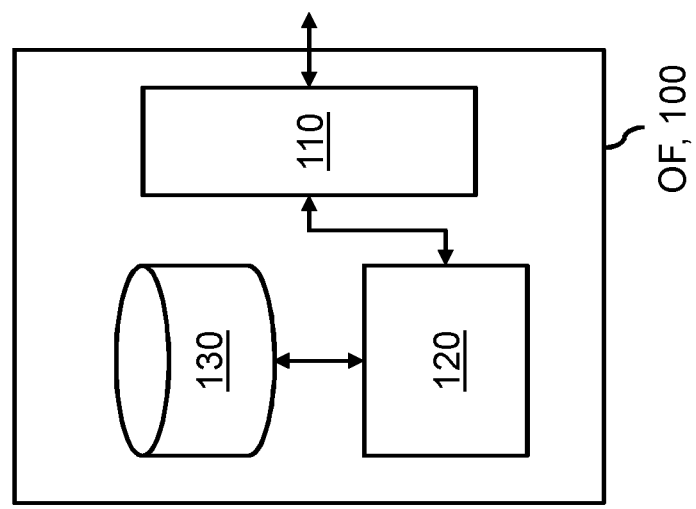
FIG. 5 shows a system configured as orchestration function.

FIG. 5 shows a system 100 which may be configured as an orchestration function as described elsewhere in this specification. The system 100 may comprise a network interface 110 to the mobile network, e.g., to a core network of the mobile network. The network interface 110 which may take any suitable form, including but not limited to a wired network interface based on Ethernet or optical fiber or a wireless network interface such as a satellite or microwave-based wireless communication interface. In general, the network interface 110 may be a physical network interface but in some examples also a virtual network interface, e.g., in the form of a software-defined interface. The system 100 may further comprise a processor subsystem 120, which may be configured, e.g., by hardware design or software, to perform the operations described in this specification in as far as pertaining to the orchestration function. For example, the processor subsystem 120 may be embodied by a single Central Processing Unit (CPU), but also by a combination or system of such CPUs and/or other types of processing units. In general, the system 100 may be embodied by a (single) device or apparatus, e.g., a network server. However, the system 100 may also be embodied by a distributed system of such devices or apparatuses, e.g., a distributed system of network servers.

FIG. 5 further shows the system 100 comprising a data storage 130, such as a hard disk, a solid-state drive, an array of hard disks or an array of solid-state disks, which may be used by the system 100 for storing data. For example, the system 100 may cache route data received from mobile devices, cache migration data to be transmitted to mobile devices, etc.

Figure 6:
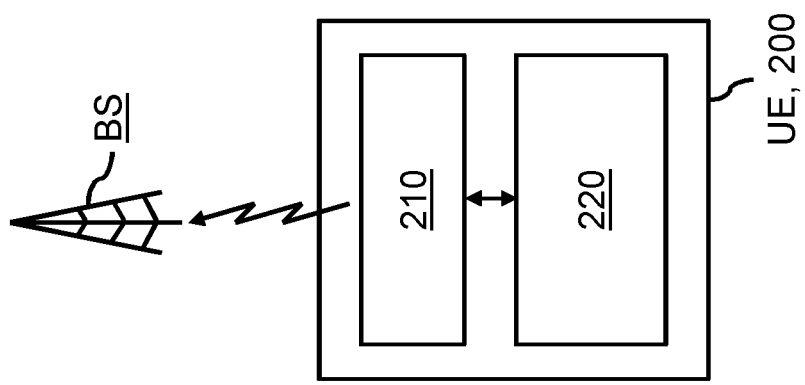
FIG. 6 shows a mobile device or mobile user equipment.

FIG. 6 shows a mobile device 200 as described elsewhere in this specification. The mobile device 200 may comprise a network interface 210 for wirelessly connecting to a mobile network via respective base stations BS of the mobile network. The network interface 210 may take any suitable form, including but not limited to a 4G, 5G or later generation radio interface or a Wi-Fi radio interface for wirelessly connecting to access points. The mobile device 200 may further comprise a processor subsystem 220, which may be configured, e.g., by hardware design or software, to perform the operations described in this specification in as far as pertaining to the mobile device. For example, the processor subsystem 220 may be embodied by a single Central Processing Unit (CPU), but also by a combination or system of such CPUs and/or other types of processing units. Although not explicitly shown in FIG. 6, the mobile device 200 may comprise a data storage, such as a solid-state drive or flash memory, which may be used by the mobile device 200 for storing data. For example, the mobile device 200 may temporarily buffer route data to be sent to the orchestration function or migration data received from the orchestration function.

In general, the mobile device 200 may be embodied by a (single) device or apparatus, e.g., a smartphone, personal computer, laptop, tablet device, smart watch, smart glasses, head mounted display device, etc. The mobile device 200 may also be, or be part of, a vehicle such as car, motorcycle, truck, bicycle, scooter, etc. The mobile device 200 may also be part of an autonomous entity, such as an unmanned aerial or non-aerial (e.g. road-based) vehicle or robot. However, the mobile device 200 may also be embodied by a distributed system of such devices or apparatuses. In general, the mobile device 200 may be a so-called User Equipment (UE) or a mobile UE of a mobile telecommunication network, such as a 5G mobile network.

In general, the system 100 representing the orchestration function and the mobile device 200 may each be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function of the system or mobile device may be implemented as a circuit.

Figure 7:
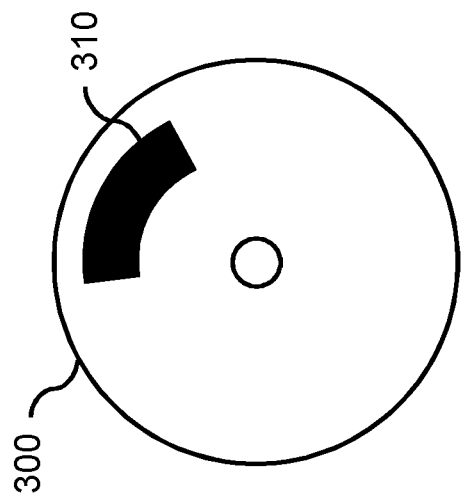
FIG. 7 shows a computer readable medium comprising data.

It is noted that any of the methods described in this specification, for example in any of the claims, may be implemented on a computer as a computer-implemented method, as dedicated hardware, or as a combination of both. Instructions for the computer, e.g., executable code, may be stored on a computer readable medium 300 as for example shown in FIG. 7, e.g., in the form of a series 310 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows by way of example an optical storage device 300.

In an alternative embodiment of the computer readable medium 300 of FIG. 7, the computer readable medium 300 may comprise transitory or non-transitory data 310 representing at least one of: route data, migration data and an initiation message.

Figure 8:
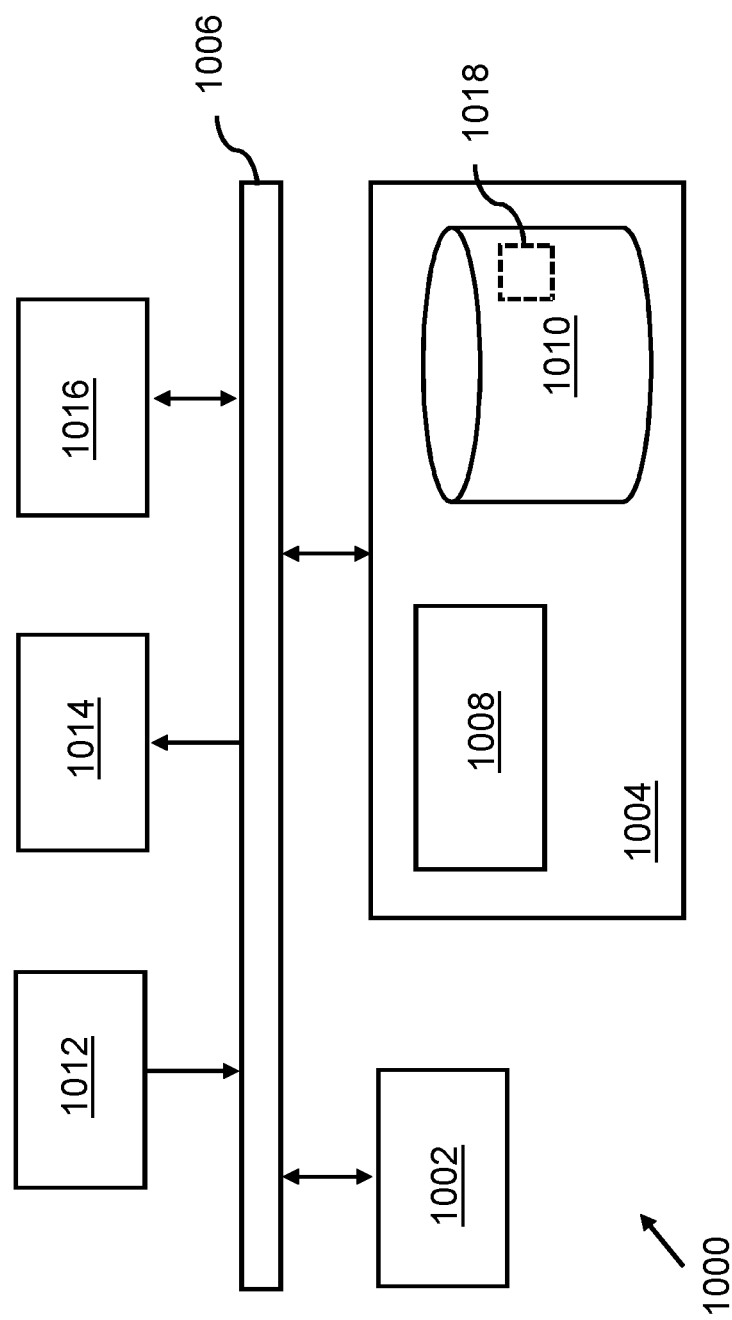
FIG. 8 shows an exemplary data processing system.

FIG. 8 is a block diagram illustrating an exemplary data processing system that may be used in the embodiments described in this specification. Such data processing systems include data processing entities described in this specification, including but not limited to the orchestration function or the system implementing the orchestration function or the mobile device or the (mobile) user equipment.

The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 8, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the orchestration function or the system representing the orchestration function. In that case, application 1018 may represent an application that, when executed, configures data processing system 1000 to perform the functions described in this specification with reference to the orchestration function or its system. In another aspect, data processing system 1000 may implement the mobile device or the (mobile) user equipment. In that case, application 1018 may represent an application that, when executed, configures data processing system 1000 to perform the functions described in this specification with reference to the mobile device or the (mobile) user equipment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system configured as an orchestration function for a mobile network, wherein the mobile network comprises edge nodes which are configurable to provide edge computing resources to mobile devices, wherein the system comprises:
   a network interface to the mobile network;
   a processor subsystem for at least in part orchestrating a migration of an edge computing resource for a mobile device from a first edge node to a second edge node by being configured to:
   obtain route data which is indicative of a route along which the mobile device is predicted to travel;
   based on the route data, identify one or more migration points along the route, the one or more migration points defining respective geolocations at which the second edge node is anticipated to have a better bandwidth and/or latency to the mobile device than the first edge node;
   via the network interface, send migration data to the mobile device, the migration data being indicative of the one or more migration points;
   via the network interface, receive an initiation message from the mobile device, the initiation message representing a notification of the mobile device of anticipating to reach a respective one of the migration points; and
   based on the initiation message, start the migration of the edge computing resource from the first edge node to the second edge node;
   wherein the processor subsystem is further configured to:
   determine a time for the mobile device to send the initiation message, wherein the time is defined as a time period before reaching the respective one of the migration points; and
   provide the time period to the mobile device.

2. The system according to claim 1, wherein the processor subsystem is configured to obtain the route data via the network interface from the mobile device, wherein the route data is indicative of a planned route of the mobile device.

3. The system according to claim 1, wherein the mobile device is connected to the network via respective base stations, and wherein the processor subsystem is configured to determine the migration points as respective geolocations at which a hand-over is anticipated to take place from a base station to another base station and at which, after the hand-over, the second edge node is anticipated to have a better bandwidth and/or latency to the mobile device than the first edge node.

4. The system according to claim 1, wherein the processor subsystem is configured to determine the time based on a type of the edge computing resource to be migrated to the second edge node.

5. The system according to claim 1, wherein the processor subsystem is configured to, in response to the initiation message, send resource data to the mobile device identifying the second edge node to which the edge computing resource is to be migrated.

6. The system according to claim 1, wherein the processor subsystem is configured to start the migration of the edge computing resource from the first edge node to the second edge node by transferring a virtual machine image of a virtual machine from the first edge node to the second edge node.

7. A mobile device for a mobile network, wherein the mobile network comprises edge nodes which are configurable to provide edge computing resources to mobile devices, wherein the mobile device comprises:
   a network interface for wirelessly connecting to the mobile network via respective base stations of the mobile network;
   a processor subsystem configured to:
   via the network interface, receive migration data from an orchestration function of the mobile network, wherein the migration data is indicative of one or more migration points along a route along which the mobile device is predicted to travel, the one or more migration points defining respective geolocations at which a second edge node is anticipated to have a better bandwidth and/or latency to the mobile device than a first edge node;
   based on the migration data and a current geolocation of the mobile device, send an initiation message to the orchestration function before reaching a respective one of the migration points, wherein the initiation message is configured to trigger the orchestration function to start the migration of the edge computing resource from the first edge node to the second edge node;
   wherein the processor subsystem is configured to send the initiation message at a time which is defined as a time period before reaching the respective migration point.

8. The mobile device according to claim 7, wherein the initiation message comprises at least one of a group of:
   an identification or characterization of the edge computing resource;
   the migration point which is anticipated to be reached;
   an absolute or relative time of reaching the migration point; and
   the current geolocation of the mobile device.

9. The mobile device according to claim 7, wherein the processor subsystem is further configured to:
   generate route data indicative of a planned route along which the mobile device is planned to travel; and
   via the network interface, send the route data to the orchestration function.

10. The mobile device according to claim 9, wherein the route data comprises at least one of a group of:
    a list of waypoints defining geolocations which characterize at least part of the planned route;
    a list of track points defining geolocations which together form a track between at least two subsequent waypoints;
    an identifier of a destination of the planned route; and
    a current geolocation of the mobile device.

11. The mobile device according to claim 7, wherein the processor subsystem is configured to:
    based on the migration data, identify a notification point which represents a geolocation at which the initiation message is to be sent; and
    send the initiation message when the current geolocation of the mobile device reaches the notification point.

12. The mobile device according to claim 7, wherein the migration data comprises at least one of a group of:
- a geolocation defining a migration point;
- a geolocation and a radius defining a migration point, wherein the migration point is reached by arriving within the radius of the migration point; and
- a set of at least two geolocations defining a line of migration points, wherein the line of migration points is reached by crossing the line.

13. A computer-implemented method for, in a mobile network which comprises edge nodes which are configurable to provide edge computing resources to mobile devices, at least in part orchestrating a migration of an edge computing resource for a mobile device from a first edge node to a second edge node, wherein the method comprises:
- obtaining route data which is indicative of a route along which the mobile device is predicted to travel;
- based on the route data, identifying one or more migration points along the route, the one or more migration points defining respective geolocations at which the second edge node is anticipated to have a better bandwidth and/or latency to the mobile device than the first edge node;
- sending migration data to the mobile device, the migration data being indicative of the one or more migration points;
- receiving an initiation message from the mobile device, the initiation message representing a notification of the mobile device of anticipating to reach a respective one of the migration points;
- determining a time for the mobile device to send the initiation message, wherein the time is defined as a time period before reaching the respective one of the migration points;
- providing the time period to the mobile device; and
- based on the initiation message, starting the migration of the edge computing resource from the first edge node to the second edge node.

14. A non-transitory computer-readable medium comprising non-transitory data representing a computer program, the computer program comprising instructions for causing a processor system to perform the method according to claim 13.

15. A computer-implemented method for use with a mobile device for a mobile network, wherein the mobile network comprises edge nodes which are configurable to provide edge computing resources to mobile devices, wherein the method comprises:
- receiving migration data from an orchestration function of the mobile network, wherein the migration data is indicative of one or more migration points along a route along which the mobile device is predicted to travel, the one or more migration points defining respective geolocations at which a second edge node is anticipated to have a better bandwidth and/or latency to the mobile device than a first edge node;
- based on the migration data and a current geolocation of the mobile device, sending an initiation message to the orchestration function before reaching a respective one of the migration points, the initiation message sent at a time which is defined as a time period before reaching the respective migration point, wherein the initiation message is configured to trigger the orchestration function to start the migration of the edge computing resource from the first edge node to the second edge node.

16. A non-transitory computer-readable medium comprising non-transitory data representing a computer program, the computer program comprising instructions for causing a processor system to perform the method according to claim 15.

* * * * *

UNITED STATES PATENT AND TRADEMARK OFFICE
CERTIFICATE OF CORRECTION

| | |
|---|---|
| PATENT NO. | : 12,349,168 B2 |
| APPLICATION NO. | : 17/782101 |
| DATED | : July 1, 2025 |
| INVENTOR(S) | : Jan-Willem Martin Kleinrouweler, Lucia D'Acunto and Toni Dimitrovski |

It is certified that error appears in the above-identified patent and that said Letters Patent is hereby corrected as shown below:

On the Title Page

Item (72) Inventors, delete:
"Toni DImitrovski" and insert -- Toni Dimitrovski --.

Signed and Sealed this
Twenty-seventh Day of January, 2026

John A. Squires
*Director of the United States Patent and Trademark Office*